Patented Jan. 17, 1933

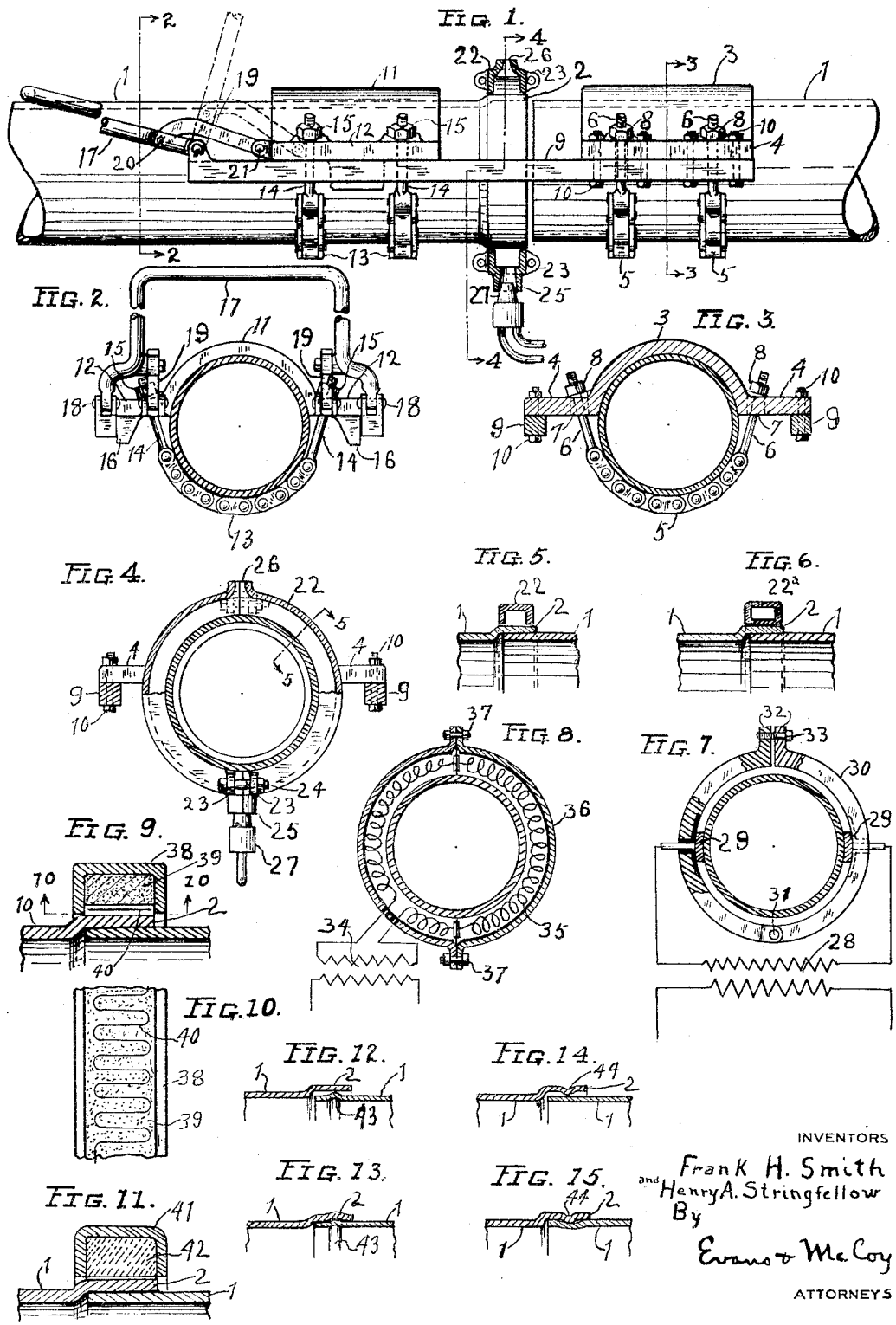

1,894,835

UNITED STATES PATENT OFFICE

FRANK H. SMITH, OF KENT, AND HENRY A. STRINGFELLOW, OF AKRON, OHIO

METHOD OF AND APPARATUS FOR JOINING PIPES

Application filed September 13, 1928. Serial No. 305,827.

This invention relates to improvements in methods of and apparatus for joining pipes and more particularly to the building of pipe lines of steel tubing such as employed for gas, oil, water or any fluid or vapor lines.

Joints which have heretofore been most extensively used in such lines have been either couplings, which are made fluid-tight by means of packing held in place by bolt-connected retaining rings or welded joints, or screwed joints. These forms of joints are expensive and the welding of the joints is unsatisfactory by reason of the great difficulty of making a perfect weld throughout the circumference of the pipe when working at the bottom of a narrow trench. For this reason welded joints are liable to break or develop leaks. The present invention has for its object to provide a strong, fluid-tight joint which does not require expensive operations on the pipe and which can be quickly and easily made in the field.

A further object is to provide a method of and apparatus for making the joint by which the pipes may be quickly and easily joined and which does not require skilled labor. More specifically it is the object of the present invention to provide a joint which is made by shrinking the end of one pipe onto the end of the other and to provide apparatus by which such a joint may be quickly and easily made in the field.

With the above and other objects in view, the invention may be said to comprise the joint, the method and the apparatus as illustrated in the accompanying drawing hereinafter described and particularly set forth in the appended claims, together with such variations and modifications thereof as will be apparent to one skilled in the art to which the invention appertains.

Reference should be had to the accompanying drawing in which:

Fig. 1 is a side elevation showing the ends of a pair of pipes to be joined, together with the apparatus by means of which the pipes are joined.

Fig. 2 is a section taken on the line indicated at 2—2 in Fig. 1.

Fig. 3 is a section taken on the line indicated at 3—3 in Fig. 1.

Fig. 4 is a section taken on the line indicated at 4—4 in Fig. 1.

Fig. 5 is a section taken on the line indicated at 5—5 in Fig. 4.

Fig. 6 is a section similar to Fig. 5 showing a modified form of heater.

Fig. 7 is a diagrammatic view showing an electrical resistance method of heating a pipe end.

Fig. 8 is a diagrammatic view showing a method of heating pipe ends in which electrical currents are set up in the pipe by induction.

Figs. 9 and 10 show an electrical heater adapted to apply heat to a pipe end by radiation, Fig. 9 being a transverse section and Fig. 10 a fragmentary inside elevation of the heater.

Fig. 11 shows in transverse section a modified form of electrical heater.

Figs. 12 and 13 show a modified form of joint which may be made by the method of the present invention; Fig. 12 showing the joint assembled before contraction of the bell, Fig. 13 showing the joint after contraction of the bell.

Figs. 14 and 15 are views corresponding to Figs. 12 and 13 showing a further modification of the joint.

Referring to the accompanying drawing, the pipes 1 to be joined are of identical construction and one end of each is slightly larger than the other preferably being expanded to form a bell 2. The larger end of one pipe will not normally receive the small end of the next pipe for the reason that the bell is formed to an internal diameter slightly less than the external diameter of the small end.

By the method of the present invention heat is applied to the bell causing the same to expand until its internal diameter is slightly greater than the external diameter of the pipe end to which it is to be joined, whereupon the latter pipe end is inserted in the bell which is then allowed to cool and shrink upon the pipe end within it, thus forming a joint which is tight throughout its circumference.

The increase in the diameter of the bell for a given rise in temperature may be easily computed and the diameter to which the bell is originally formed will be such as to provide sufficient clearance when the bell is expanded for the insertion of the pipe to which it is to be joined and will permit of reasonable manufacturing tolerances in the dimensions of the pipe and bell.

There is necessarily very little clearance between the bell when expanded by heat and the pipe end to be inserted therein, and, in order to make the method of the present invention available for use in joining pipes as they are laid in the trenches, a device is provided for assembling the pipes after the bell has been heated and expanded. This device, which is illustrated in Figs. 1 to 3 of the drawing, serves to position the pipes in axial alinement and to move the pipes into engagement while maintaining the axial alinement thereof.

One of the pipes has rigidly clamped thereto a saddle 3 which is formed to fit upon the top of the pipe and which has laterally projecting flanges 4. The saddle 3 is secured to the pipe by means of clamping chains 5 which have eye bolts 6 attached to the opposite ends thereof, the eye bolts 6 extending through apertures 7 in the flanges 4 and having nuts 8 at their upper ends which bear upon the top faces of the flanges. By tightening the nuts 8 the pipe is tightly gripped between the saddle 3 and chains 5. A guide bar 9 is rigidly attached by means of bolts 10 to each of the flanges 4 and these guide bars extend parallel with the axis of the pipe to which the saddle is attached and project beyond the end thereof.

Near the end of the adjacent pipe there is is rigidly secured a saddle 11 similar to the saddle 3, the saddle 11 being provided with side flanges 12 and clamping chains 13 which have eye bolts 14 extending through the flanges and secured by nuts 15. The flanges 12 of the saddle 11 rest on the projecting ends of the guide bars 9 but are unattached thereto so that the saddle 11 and the pipe which it supports may be moved along the guide bars 9. The bottom faces of the flanges 12 of the saddle 11 lie in the plane of the bottom faces of the flanges 4 to which the guide bars 9 are attached so that the axes of the two pipes are at the same level. In order to prevent lateral misalinement the flanges 12 are provided with guide lugs 16 which engage the inner faces of the guide bars 9. The two pipes are thus supported with the end of one accurately registering with the end of the other, and after the bell has been expanded by heat the saddle 11 may be slid along the guide bars to cause the unexpanded pipe end to enter the heated bell.

In order to quickly effect the assembly after the bell has been heated sufficiently, a lever 17 of U-shape straddles the pipe 1 and has the ends of its arms connected by pivots 18 to the ends of the guide bars 9. A link 19 is connected at one end by pivots 20 to each of the arms of the lever 17, and the opposite ends of these links are connected by pivots 21 to the flanges 12 of the saddle 11. By swinging the lever 17 from the position shown in full lines in Fig. 1 to the position shown in dotted lines in said figure, the saddle 11 is moved toward the saddle 3, bringing the end of the pipe into the bell.

Any suitable means may be employed for heating the bell, but it is highly desirable that the heating be uniform throughout the circumference of the bell and also that the heating device be portable and capable of being quickly and easily set up at successive joints.

One form of heating device which embodies the advantageous features above referred to is shown in Figs. 1 and 4 and this device consists of a hollow annular casing 22 which is formed of two halves adapted to be secured together over the bell. The ends of the sections of the hollow casing 22 are provided with flanges 23 which receive clamping bolts 24 so that the casing may be readily assembled on the bell and removed therefrom after the joint is made. The hollow casing 22 has an opening 25 at the bottom thereof and an outlet opening 26 at the top thereof. A blow torch 27 may be inserted in the opening 25 to direct a flame into the hollow casing 22 which passes up through the casing on opposite sides of the bell and out through the outlet or chimney 26.

The annular casing 22 may be in the form of an inwardly facing channel with side flanges having their edges contiguous to the surface of the bell as shown in Figs. 1 and 5, or the casing may be of tubular form with its inner wall closely overlying the bell as shown at 22a in Fig. 6. In the first case the bell is heated by direct conduction of heat from the burning fuel and in the second case by radiation of heat from the inner wall of the tubular casing. A more rapid heating is obtained with the first form of heater but the second form of heater will apply the heat more uniformly.

In view of the importance of avoiding distortion of the bell by uneven heating, we prefer to employ an electrical heating device whenever a suitable source of current is readily available.

In Fig. 7 of the drawing there is shown an electrical heating device for supplying alternating current at a low voltage and high amperage directly to the wall of the bell to generate heat therein. In this device the current from the secondary of a suitable transformer 28 is led to brushes 29 at diametrically opposite points on the exterior of the bell. The brushes are held in place by an annular casing 30 composed of two semicircular sections connected by a pivot 31 and having flanges 32 at their free ends which receive a clamping bolt 33.

In Fig. 8 of the drawing there is shown a heating device in which alternating current is led from the secondary of a suitable transformer 34 to a coil 35 surrounding the bell to set up induction currents in the metal of the bell to heat the same. The coil 35 is enclosed in a hollow annular casing 36 formed of two channel-shaped semicircular sections connected by clamping bolts 37.

In Figs. 9 and 10 of the drawing there is shown an electrical heater which heats the bell by radiation. This heater consists of a channel-shaped annular casing 38 similar to that shown in Fig. 8 in which there is a refractory backing 39 upon the inner face of which there is laid a resistance coil 40 of nichrome wire or other suitable resistance material which is heated by the passage of an electric current and which radiates its heat to the wall of the bell.

In Fig. 11 of the drawing there is shown a heater which operates upon the same principle as the heater shown in Figs. 9 and 10 but employing a different form of resistance. In this modification a channel shaped casing 41 of a construction similar to that shown in Fig. 8 is filled with a refractory conductor offering the necessary resistance to the electric current. Such a refractory conductor may be made by incorporating carborundum in granular form in a suitable binder.

All of the various forms of heating devices above described can be readily attached to the bell and can be readily detached after the joint is made. The bell can be quickly heated to obtain the necessary expansion, and the heating can be instantly discontinued when desired.

In making a joint the heating device is attached to the bell and the assembling device is attached to the pipes. Heat is then applied to the bell until it has been sufficiently expanded whereupon the lever 17 is actuated to slip the pipe ends into telescopic engagement. The bell is then allowed to cool and the heating and assembling devices are removed for use at the next joint. In shrinking on the pipe end within it, the bell will be drawn into close conformity with the surface of the pipe forming a fluid tight joint and even if the pipes be at a slight angle to each other as is the case when the pipe line extends over hills and valleys the bell will be drawn into close conformity to the pipe end within and throughout its circumference and a tight joint will be formed.

In Figs. 12 to 15 there are shown modifications of the joint formed by the method of the present invention which have the advantage of greater strength and also of greater adaptability to angular misalinements.

In Figs. 12 and 13 there is shown a joint in which one or more circumferential beads 43 are formed on the smaller end of each pipe for engagement within the bell. In this case the bell is formed to an internal diameter slightly less than the external diameter of the bead or beads and in shrinking is drawn over the bead or beads to form an interlocking connection.

In Figs. 14 and 15 of the drawing the bell is provided with one or more inwardly projecting beads 44 which, as the bell shrinks, are pressed into the body of the pipe within the bell.

In either of the modifications above described it will be apparent by reference to Figs. 12 and 14 that small angular misalinements are readily accommodated.

The important advantages of the present invention are the provision of a joint which is fluid-tight, strong and durable and which does not require operations on the pipe ends of a nature to materially increase the cost of manufacture, the provision of a method by which the joint may be made easily and quickly and which does not require skilled labor, and the provision of heating and assembling devices by which the heating and assembling operations may be quickly and easily performed.

What we claim is:

1. Apparatus for joining a pair of axially abutting pipes comprising rigid supporting members rigidly secured to one pipe and extending parallel to the axis of one pipe past the end thereof, means for slidably supporting the other pipe on said rigid members in axial alinement with the first pipe, and means for shifting the second pipe into telescopic engagement with the first.

2. Apparatus for joining pipes comprising a saddle, means carried by the saddle for rigidly clamping a pipe thereto, parallel rigid longitudinally extending arms rigidly attached at one end to said saddle and adapted to extend beyond the end of and in a direction substantially parallel to the axis of a pipe clamped in the saddle, a second saddle slidably mounted on said arms, means carried by the second saddle for rigidly clamping a second pipe therein and for supporting the same on said arms in axial alinement with the first pipe, and means for sliding the second saddle on said arms to enter the end of one pipe into the end of the other.

In testimony whereof we affix our signatures.

FRANK H. SMITH.
HENRY A. STRINGFELLOW.